J. C. MONTGOMERY.
LAWN MOWER.
APPLICATION FILED MAR. 9, 1908.

953,541.

Patented Mar. 29, 1910.

2 SHEETS—SHEET 1.

Witnesses

Inventor
J.C. Montgomery.
By
Attorney

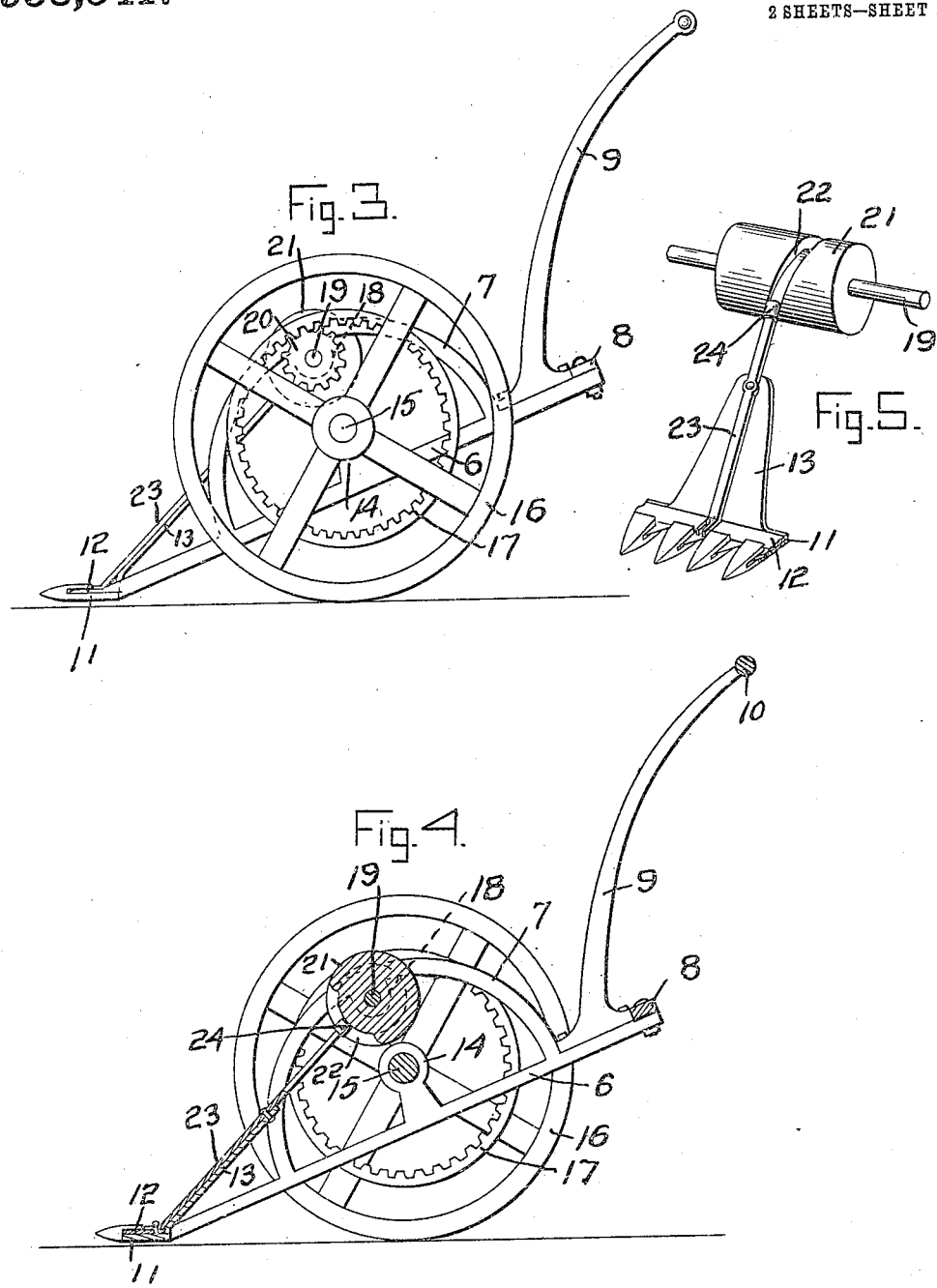

UNITED STATES PATENT OFFICE.

JESSIE C. MONTGOMERY, OF MODOC, INDIANA.

LAWN-MOWER.

953,541.  Specification of Letters Patent.  Patented Mar. 29, 1910.

Application filed March 9, 1908. Serial No. 420,025.

*To all whom it may concern:*

Be it known that I, JESSIE C. MONTGOMERY, a citizen of the United States, residing at Modoc, in the county of Randolph, State of Indiana, have invented certain new and useful Improvements in Lawn-Mowers; and I do hereby declare the following to be a full, clear, and exact description of the invention, such as will enable others skilled in the art to which it appertains to make and use the same.

This invention relates to lawn mowers and more particularly to lawn mowers of the sickle type.

The primary object of the invention is to provide a lawn mower of this type which will operate effectually under all conditions. In lawn mowers of this type, it not infrequently happens that the frame, owing to constant use of the machine, becomes loosened at the joints of their component members and while I have aimed to provide a lawn mower in which the members of its frame are connected in as secure a manner as possible, I have also aimed to so construct the cutter bar reciprocating mechanism that even should the members of the frame of the lawn mower become loosened at their connections, the mechanism will still act effectually.

In order to attain the result mentioned above, that element of the cutter bar reciprocating mechanism which acts directly upon the cutter bar is mounted upon a bracket which is formed with the sickle bar of the machine so that while the members of the frame of the machine may become loosened at their points of connection, the said element will not have its efficiency of action impaired.

Figure 1:
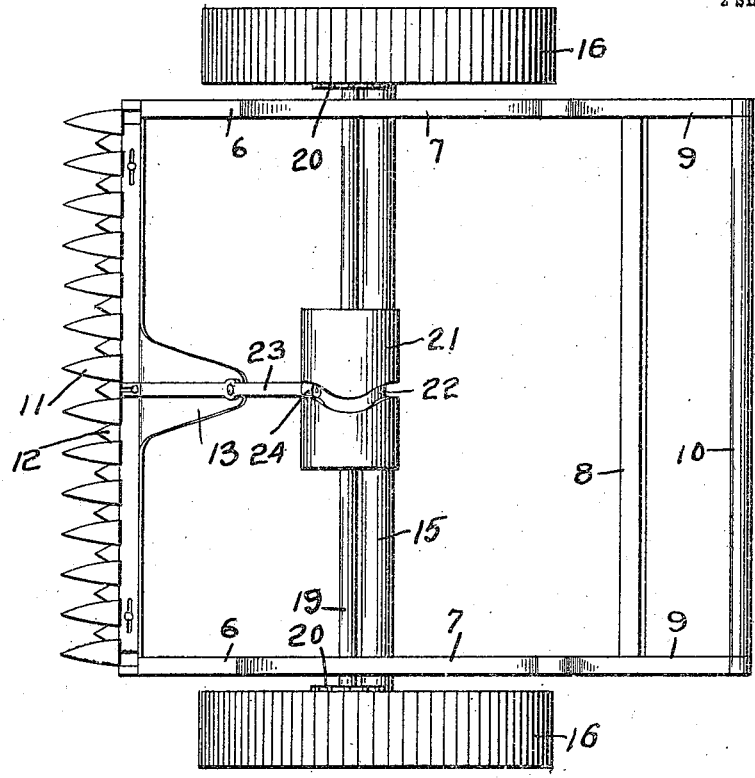
Figure 2:
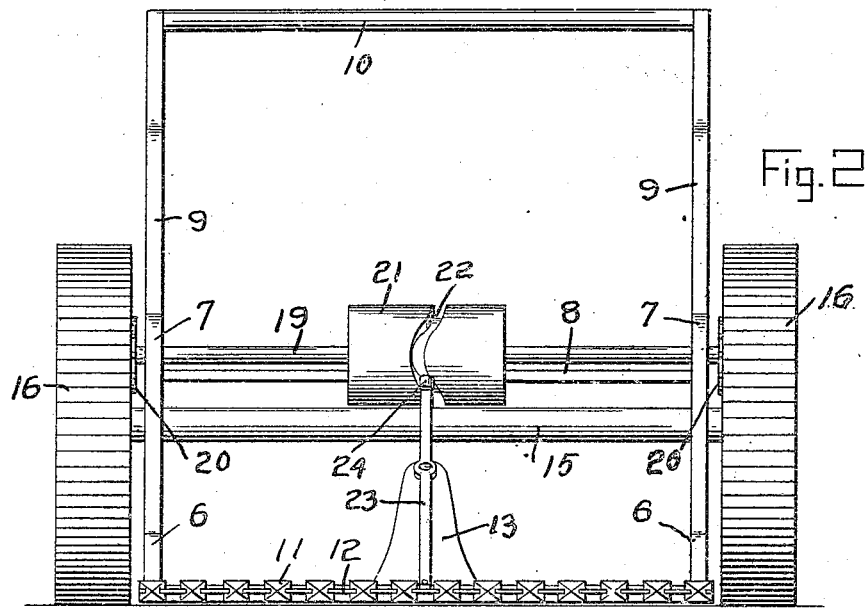

In the accompanying drawings, Figure 1 is a top plan view of a mower constructed in accordance with my invention, Fig. 2 is a front elevation thereof, Fig. 3 is a side elevation, Fig. 4 is a vertical sectional view taken from front to rear, and, Fig. 5 is a detail perspective view of the central portion of the sickle bar showing the manner of mounting the element of the cutter bar reciprocating mechanism which acts directly upon the cutter bar.

As shown in the drawings, the mower embodied in my invention includes in its frame construction side members or castings comprising each a side bar 6 upon which is formed an arched frame element 7. At their rear ends, the said side members are connected by means of a cross bar 8 which is bolted to the rear end of the side bars 6, the said ends of the said side bars being extended rearwardly of the arched frame member 7. Upright handle supports 9 are bolted at their lower ends to the rearwardly extended end portions of the side bars 6 and connecting the upper ends of these handle supports is a handle bar 10 which is to be grasped when the machine is in operation. The forward ends of the side bars 6 are also extended forwardly beyond the frame member 7 and connecting the said forward ends of the said side bars 6 is the sickle bar of the machine.

The sickle bar mentioned above is of the ordinary construction, comprising a finger bar 11 bolted at its ends to the forwardly extended ends of the side bars and a cutter bar 12 which is mounted for reciprocatory movement upon the finger bar. A bracket 13 is formed integral with the finger bar 11 and is directed rearwardly and upwardly from the rear edge thereof and serves as a mounting or support for that element of the cutter bar reciprocating mechanism which acts directly upon the said cutter bar as will be presently fully described.

Suitable bearings 14 are formed or secured upon the side bars 6 within the arches of the respective frame members 7 and journaled for rotation in these bearings is the axle 15 of the mower, the said axle having secured to its ends ground wheels 16 provided each with an annular gear 17. These ground wheels have their treads corrugated in the usual manner so that as the machine is pushed forwardly over the surface of the ground, the wheels will serve to rotate the said axle 15. Formed or secured to each of the arched members 7 is a bearing 18 and journaled for rotation in these bearings is a shaft 19, the said shaft having secured at each of its ends a pinion 20, these pinions being in mesh with the respective gears 17 whereby rotation of the wheels 16 will result in a corresponding rotation of the shaft 19.

Fixed upon the shaft 19, preferably at a point mid-way between its ends, is a cylinder 21 which is formed in its circumference with a continuous cam groove 22. An oscillatory arm 23 is mounted for oscillatory movement upon the supporting bracket 13 and journaled at the rear or upper end of this arm is a roller 24 which travels in the cam slot 22, the lower end of the arm being pivotally connected with the cutter bar 12 of the sickle apparatus.

From the foregoing description of my invention it will be observed that I have provided, as a support for the element of the sickle bar reciprocating mechanism which acts directly upon the cutter bar thereof, a bracket which is rigidly connected with the finger bar of the sickle apparatus and that upon rotation of the shaft 19 and a like rotation of the cylinder 21, the oscillatory arm 23 will operate to reciprocate the cutter bar of the sickle apparatus. It will also be understood from the foregoing description of my invention that in view of the fact that the support 13 for the oscillatory arm 23 is rigid, the mower will operate successfully even should the members 6 and 8 of the frame of the mower become loosened at their points of connection.

What is claimed, is:—

In a frame for lawn mowers, a pair of side members each provided with a bearing intermediate its end, an arch integrally formed on each of said side members provided with a bearing on the under side thereof, said arch bearing being in vertical alinement with reference to the side member bearing, a forward extension on each of said frame members, a cutter bar connected to said forward extensions, and a rearward extension on each of said frame members and a handle and rear brace connected to the rearward extensions.

In testimony whereof, I affix my signature, in presence of two witnesses.

JESSIE C. MONTGOMERY.

Witnesses:
A. A. CONANOE,
JOHN L. PETRO.